(12) United States Patent
Hammer et al.

(10) Patent No.: US 11,190,603 B2
(45) Date of Patent: Nov. 30, 2021

(54) INTELLIGENT SAMPLING OF DATA GENERATED FROM USAGE OF INTERACTIVE DIGITAL PROPERTIES

(71) Applicant: International Business Machines Corporation, Armonk, NY (US)

(72) Inventors: Stephen C. Hammer, Marietta, GA (US); Gray Cannon, Miami, FL (US); Aaron K. Baughman, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/354,674

(22) Filed: Mar. 15, 2019

(65) Prior Publication Data

US 2020/0296177 A1 Sep. 17, 2020

(51) Int. Cl.
*H04L 29/08* (2006.01)
*G06F 16/43* (2019.01)
*G06Q 30/02* (2012.01)

(52) U.S. Cl.
CPC .............. *H04L 67/22* (2013.01); *G06F 16/43* (2019.01); *G06Q 30/0202* (2013.01); *H04L 67/146* (2013.01); *H04L 67/10* (2013.01)

(58) Field of Classification Search
CPC ....... H04L 67/22; H04L 67/146; H04L 67/10; H04L 29/08; G06F 16/43; G06Q 30/0202; G06Q 30/02
USPC ................. 709/224, 223; 340/16.1; 370/252; 714/47.2
See application file for complete search history.

(56) References Cited

U.S. PATENT DOCUMENTS

| | | | |
|---|---|---|---|
| 6,128,624 A | 10/2000 | Papierniak | |
| 6,151,584 A | 11/2000 | Papierniak | |
| 7,330,871 B2 | 2/2008 | Barber | |
| 8,417,715 B1 | 4/2013 | Bruckhaus | |
| 8,578,041 B2 | 11/2013 | Error | |
| 10,110,687 B2 | 10/2018 | Hamid | |
| 2004/0243704 A1 | 12/2004 | Botelho | |
| 2006/0274763 A1* | 12/2006 | Error | H04L 67/22 370/400 |
| 2007/0011039 A1 | 1/2007 | Oddo | |

(Continued)

FOREIGN PATENT DOCUMENTS

EP    2071461 B1    6/2009

*Primary Examiner* — Tonia L Dollinger
*Assistant Examiner* — Mehulkumar J Shah
(74) *Attorney, Agent, or Firm* — Andrew Aubert

(57) ABSTRACT

Techniques for tailoring sampling rates for data from interactive digital properties on a feature-by-feature basis and collecting the data using the tailored sampling rates. Each feature may have an independent sampling rate irrespective of sampling rates assigned to other features. The independent sampling rates are determined based on at least one factor of predictive feature usage information based on historical feature usage information, predetermined rules, and current usage velocity of the feature. In some embodiments the independent sampling rate is influenced by the usage of an allocated resource provided to the digital property relative to a total allocation of that resource for a given time period. In some embodiments, the allocated resource is server calls to a digital data analytics server for the purposes of providing feature usage information from the interactive digital property for the performance of digital data analytics.

15 Claims, 6 Drawing Sheets

(56) References Cited

U.S. PATENT DOCUMENTS

| | | |
|---|---|---|
| 2007/0011304 A1 | 1/2007 | Error |
| 2007/0299964 A1 | 12/2007 | Wong |
| 2008/0189408 A1 | 8/2008 | Cancel |
| 2010/0306248 A1* | 12/2010 | Bao .................. G06F 16/93 707/769 |
| 2010/0312884 A1 | 12/2010 | Nandy |
| 2011/0119226 A1* | 5/2011 | Ruhl .................. G06F 16/958 706/52 |
| 2012/0323694 A1 | 12/2012 | Lita |
| 2013/0136253 A1 | 5/2013 | Liberman Ben-Ami |
| 2016/0019595 A1* | 1/2016 | Wu .................. G06Q 30/0218 705/14.66 |
| 2017/0068899 A1* | 3/2017 | Laptev .................. G06N 7/005 |
| 2018/0336587 A1* | 11/2018 | Lackman .......... G06Q 30/0244 |
| 2018/0351834 A1 | 12/2018 | Fichter |
| 2019/0295114 A1* | 9/2019 | Pavletic .................. G06N 3/08 |
| 2020/0286124 A1* | 9/2020 | Hiremath .......... G06Q 30/0254 |

\* cited by examiner

INTELLIGENT SAMPLING OF DATA GENERATED FROM USAGE OF INTERACTIVE DIGITAL PROPERTIES

BACKGROUND

The present invention relates generally to the field of digital data collection, and more particularly to data sampling techniques for data collection of usage of interactive digital properties.

Internet marketers and administrators are typically interested in understanding what actions their users are performing to better understand their audience. To solve this problem, web sites typically use an approach called a "web beacon." Implementations of this approach require the users web browser to make custom requests to a web analytics server that records user activity. This activity can be classified in two ways: an end user loading a web page (Page View), and interactions after that page has been loaded (Interactions). Interactions and the accuracy of these stats are especially interesting to web site administrators because it is a measure of engagement with the user. Web analytics services typically offer pricing based on the number of server calls that are sent from users' browsers to the web analytics server. For websites with millions of users, sending an analytics server call on every page view and interaction may be cost prohibitive.

One known solution to this problem is called "sampling." When sampling, only a portion of the user activity is sent to the web analytics server. For example, for a sample size of 10%, 90% of the traffic would be excluded from being sent to the web analytics server. In that example, a web site administrator simply multiplies the recorded statistics by 10 to obtain an estimate of the full audience size.

Web analytics is the measurement, collection, analysis and reporting of web data for purposes of optimizing and understanding web usage. Digital data analysis is an examination of data collected from digital properties such as web sites, mobile applications, smart television applications and smart computer devices over a computer network for the purpose of understanding and optimizing usage of these digital properties.

Digital properties can have a multitude of features which may be interacted with by a user. Some examples of features include, but are not limited to: (i) visiting a webpage; (ii) navigating a menu; (iii) adjusting playback and/or volume of a video element; (iv) placing products in a digital shopping cart; (v) querying or commanding a digital assistant artificial intelligence (AI).

SUMMARY

According to an aspect of the present invention, there is a method, computer program product and/or system that performs the following operations (not necessarily in the following order): (i) determining a predictive usage data set including information indicative of anticipated usage of a set of features of a digital property; (ii) determining a subset of features of the digital property for application of a data sampling threshold; (iii) for each feature of the subset of features, determining a sampling threshold value based, at least in part, on the predictive usage data set; and (iv) managing data collection of usage of the set of features based, at least in part, on the determined sampling threshold(s).

DETAILED DESCRIPTION

Figure 1:
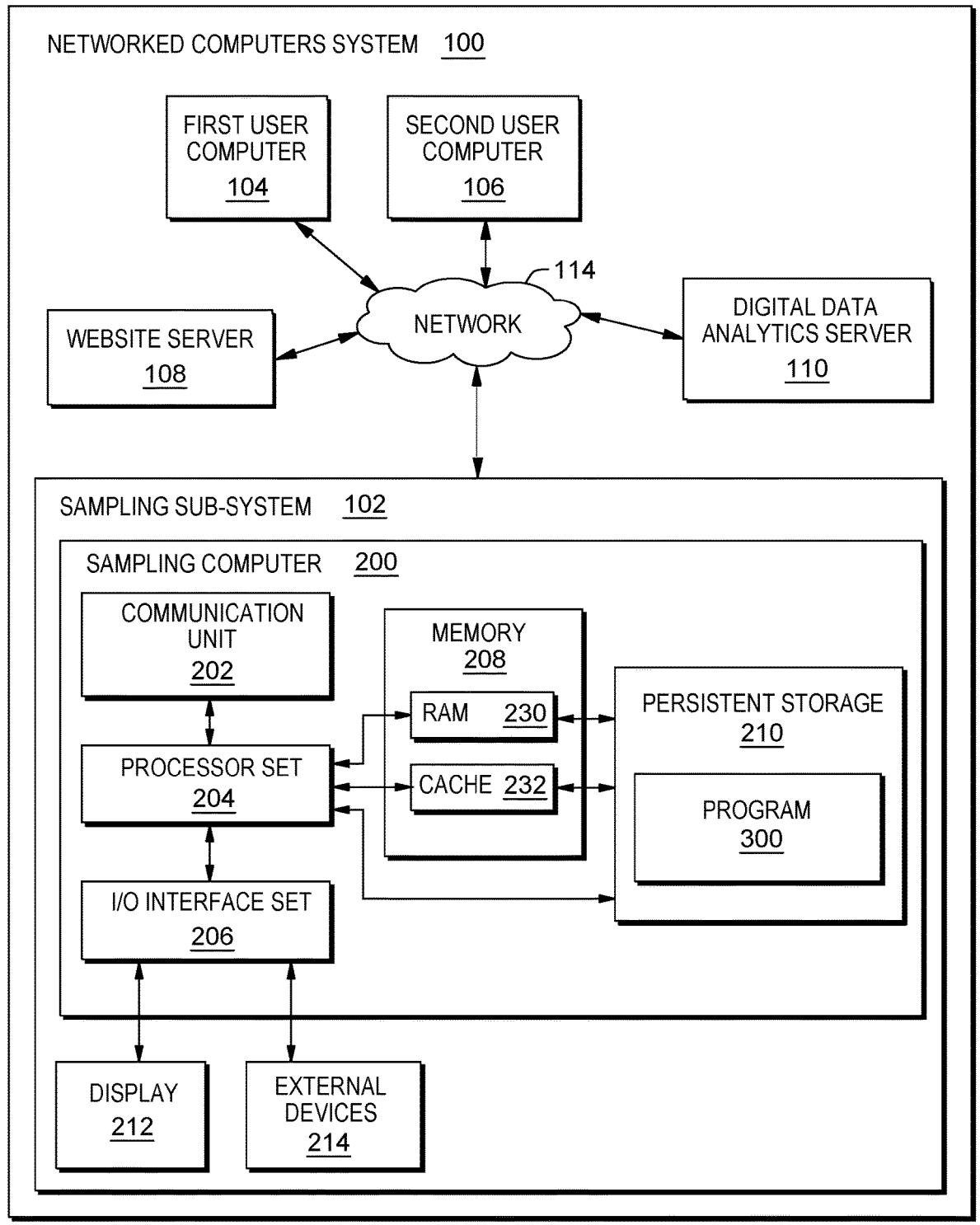
FIG. 1 is a block diagram view of a first embodiment of a system according to the present invention.

Embodiments of the present invention are directed towards tailoring sampling rates and/or thresholds of data collection of user interactions with features of a digital property. Sampling rates and/or thresholds are calculated using at least one of: (i) predefined sampling priorities; (ii) historical usage data; and (iii) current velocity of feature usage. In some embodiments, sampling rates and/or threshold calculations are based, at least in part, on a total number of digital data analytics server calls relative to a total allocation number of digital data analytics server calls. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: sampling sub-system 102; first user computer 104; second user computer 106; website server 108; digital data analytics server 110; communication network 114; sampling computer 200; communication unit 202; processor set 204; input/output (I/O) interface set 206; memory device 208; persistent storage device 210; display device 212; external device set 214; random access memory (RAM) devices 230; cache memory device 232; and program 300.

Sampling sub-system 102 is, in many respects, representative of the various computer sub-system(s) in the present invention. Accordingly, several portions of sampling sub-system 102 will now be discussed in the following paragraphs.

Sampling sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sampling sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sampling sub-system 102 is shown as a block diagram with many double arrows. These double arrows (no separate reference numerals) represent a communications fabric, which provides communications between various components of sampling sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sampling sub-system 102; and/or (ii) devices external to sampling sub-system 102 may be able to provide memory for sampling sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sampling sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with sampling computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
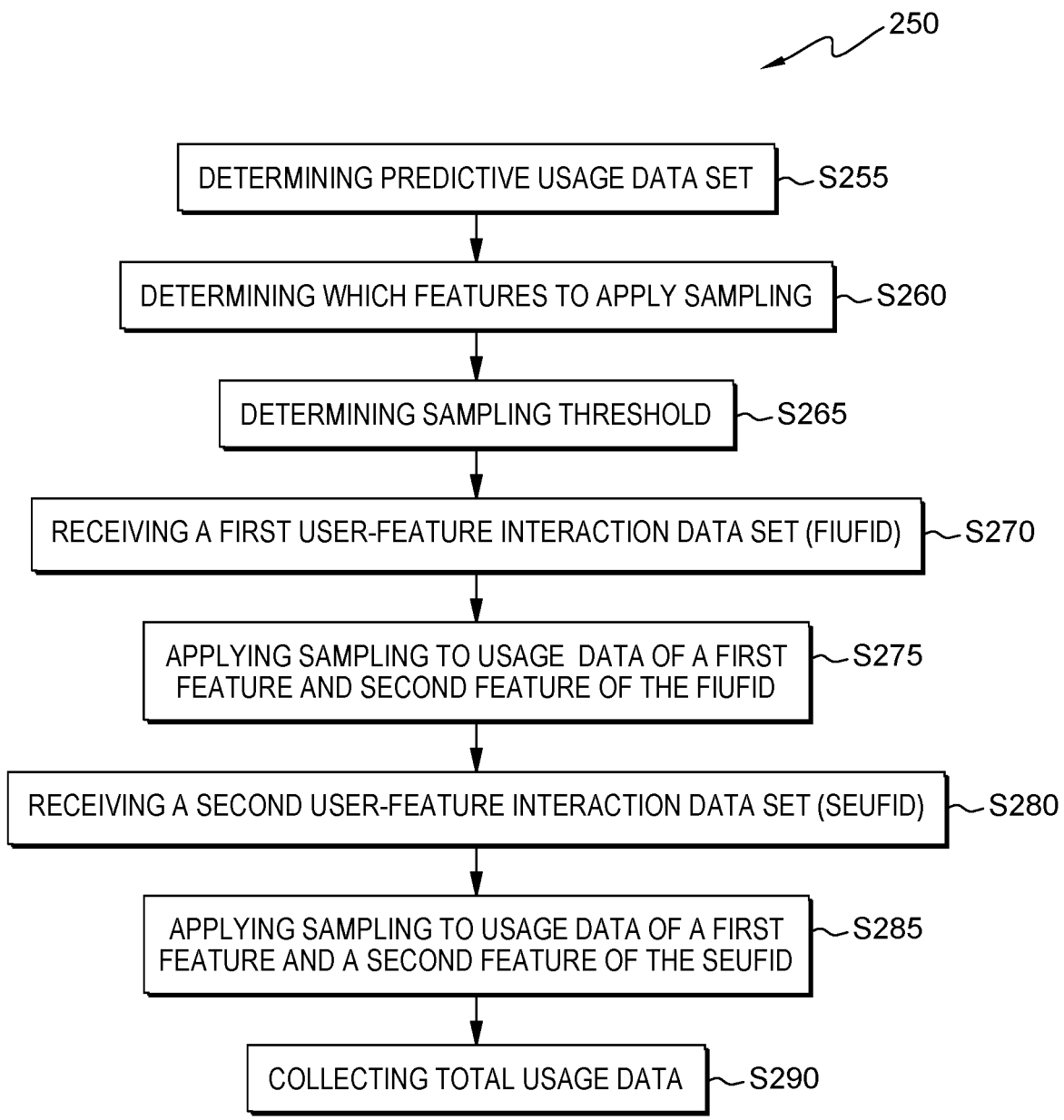
FIG. 2 is a flowchart showing a first embodiment method performed, at least in part, by the first embodiment system.
Figure 3:
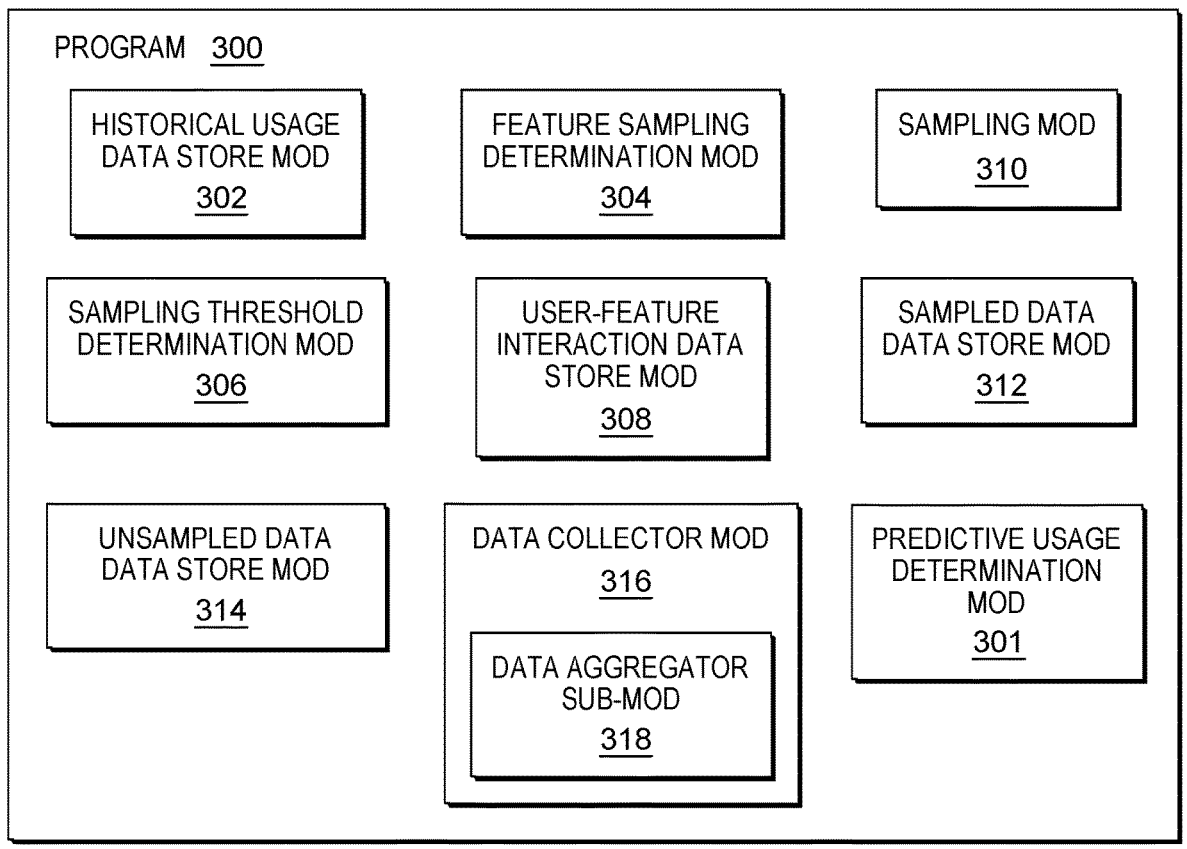
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where predictive usage determination module ("mod") 301 determines predictive usage information of three features (a first feature, a second feature and a third feature) of an internet shopping website using historical usage information stored in historical usage data store mod 302. In this simplified embodiment, historical usage information includes the following information: (i) on Fridays in November (such as today, in this simplified embodiment), users tend to use the first feature on average approximately 100,000 times, the second feature approximately 20,000 times, and the third feature approximately 700 times. Alternatively, historical usage information may be more granular, indicating rates of users interacting with a given feature broken down into demographic buckets. As a further alternative embodiment, a cumulative probability distribution function is applied to the historical usage data to determine a probability that a given user will interact with a given feature based on how frequently that feature was used in a predetermined span of time. As yet a further alternative, the probability distribution function is used to facilitate inverse sampling by approximating a quantity of user interactions with a given feature based upon a probability that a given user will interact with the given feature.

Processing proceeds to operation S260, where feature sampling determination mod 304 determines which features of the internet shopping website will have sampling applied. In this simplified embodiment, the first feature and second feature are selected for sampling because their estimated usage exceeds a predefined threshold of an allotment of digital data analytics server calls, with the predefined threshold set at 20,000 server calls per day. The third feature will have no sampling applied, as the anticipated usage of the feature appears to be relatively low compared to the other two features, any sampling may result in data inaccuracies due to small sample sizes. Alternatively, thresholds of allotments may be relaxed or ignored under specified circumstances, for example, on one or more predetermined day(s) of the calendar year. For example, on Black Friday, sampling might be disabled for identifying items placed in a shopping cart on an internet shopping website, but enabled for other features, regardless of allotments and to-date consumption of the allotments.

Alternatively, such thresholds of allotments can be adjusted based upon a consumed percentage of an allotment of digital data analytics server calls for a given period, with thresholds increased when a relatively large percentage of the allotment remains unconsumed and reduced when a relatively small percentage of the allotment remains unconsumed. As another alternative, individual features may be assigned a priority value indicative of how resistant the system should be to applying sampling to data collected about the usage of the individual feature, relative to other features. For example, accuracy in data analysis of a certain critical feature may be more important than other features and should never have sampling applied. As a further alternative, the certain critical feature may have sampling applied if not doing so would result in a cost-prohibitive number of digital data analytics server calls by consuming the entire allotment for all of the features, resulting in a complete absence of digital data analytics calls for usage of the other remaining features unless the allotment is exceeded. In this alternative, the critical feature would have sampling applied, but may have a relatively higher sample rate compared to the remaining features, carving out some of the allotment for the other features while utilizing a significant majority of the allotment for usage data of the critical feature.

Processing proceeds to operation S265, where sampling threshold determination mod 306 determines sampling thresholds for the features determined at S260. In this simplified embodiment, the first feature and the second feature were determined that sampling should apply to data collection about their usage. Also, sampling thresholds are set at 10% intervals, with 10% indicating that only 10% of usage data of a feature should be counted and 90% indicating that 90% of usage data of a feature should be counted. In this simplified embodiment, the predictive usage information indicates that approximately 100,000 user interactions with the first feature are anticipated for today and the total digital data analytics server call allotment for today is 20,000. As 0% would result in no data being included in the sampled data and 20% would result in the entire allotment being used for one feature, where the third feature has already been indicated to have no sampling applied, mod 306 determines that 10% is the appropriate amount of sampling, and will likely result in 10,000 calls to the digital data analytics server for the first feature.

A similar calculation process is applied to the second feature, with the predictive usage information indicating that the second feature will be used approximately 20,000 times today with an anticipated remaining server call allotment of approximately 9700, a sampling threshold of 40% for the second feature is anticipated to consume approximately 8,000 calls of the remaining 9,700 daily digital data analytics server call allotment, leaving approximately 1700 remaining of the daily digital data analytics server call allotment. As 1700 is less than 10% of the anticipated 20,000 usages of the second feature, the sampling threshold of the second feature cannot be increased beyond 40% at this time. In alternative embodiments, more granular adjustments may be made with respect to the sampling threshold for a given feature. Alternatively, one feature with sampling enabled may also have a sampling threshold which indicates that it should have a sample rate commensurate with the actual remaining allotment of server calls to the digital data analytics server relative to a total amount of actual usages of the feature, such that the exact amount of remaining server calls (after all other features have had their usage data sent) is used on usage data of this one feature. Other techniques for calculating sampling thresholds for features are described in greater detail below in sub-section three of this detailed description.

Processing proceeds to S270, where user-feature interaction data store mod 308 receives a First User-Feature Interaction Data set (FIUFID) from website server 108 of FIG. 1 including information indicative of a first user's interactions on first user computer 104 with the features of the internet shopping website on website server 108. In this simplified embodiment, the FIUFID includes the following information: (i) the first user interacted with and/or used the first feature 10,000 times today; (ii) the first user interacted with the second feature 3700 times today; and (iii) the first user interacted with the third feature 285 times today. Also, in this simplified embodiment, when the first user begins interacting with the internet shopping website, they are issued a sampling rate value of 1, where the sampling rate value is indicative of which sample thresholds that they will be included in. In this example embodiment, the sampling rate value is issued an integer value between 1 and 10 randomly issued to users, with each value issued once per set of 10 users and repeating after each set of 10 users. For example, a sampling rate value of 1 indicates that the user should be included in all sample thresholds of 10% or greater, a sampling rate value of 2 indicates that the user should be included in all sample thresholds of 20% or greater, but excluded from sampling thresholds below 20%, etc. The first ten users each have a unique sampling rate value selected from a set of integers between 1 and 10. The next set of ten users also each have a sampling rate value selected from a set of integers between 1 and 10. After both sets of users have had sampling rate values issued, there are: (i) 10% of users with values of 1 (two users with a value of 1); (ii) 20% of users with values of 2 or below (two users with a value of 1 and two users with a value of 2 totals four users out of an overall set of twenty users); and (iii) 30% of users with values of 3 or below (two users with a value of 1, two users with a value of 2, and two users with a value of 3 total six users out of the overall set of twenty users); etc.

Processing proceeds to S275, where sampling mod 310 applies the determined sampling thresholds to data recorded in the FIUFID correlated to the first feature and the second feature, storing usage data that has had sampling applied from the first feature and the second feature in sampled data data store mod 312 and storing usage data from the third feature that has not had sampling applied in unsampled data data store mod 314. In this simplified embodiment, the first feature has a sampling threshold of 10%, the second feature has a sampling threshold of 40%, and the first user has a sampling rate value of 1. Because the first user's sampling rate value falls within the sampling threshold for the first feature and the second feature, the first user's interactions with the first feature and the second feature are stored in the sampled data data store mod 312, which now includes an entry for today's usage of the first feature with a value of 10,000 and an entry for today's usage of the second feature with a value of 3700. As the third feature has no sampling threshold applied, the first user's interactions with the third feature are fully stored in the unsampled data data store mod 314, which includes an entry for today's usage of the third feature that has a value of 285.

Processing proceeds to S280, where user-feature interaction data store mod 308 receives a second user-feature interaction data set (SEUFID) from website server 108 of FIG. 1 including information indicative of a second user's interactions on second user computer 106 with the features of the internet shopping website on website server 108. In this simplified embodiment, the SEUFID includes the following information: (i) the second user interacted with the first feature 95,000 times today; (ii) the second user interacted with the second feature 4300 times today; and (iii) the second user interacted with the third feature 715 times today. Also, in this simplified embodiment, when the second user begins interacting with the internet shopping website, they are issued a sampling rate value of 3 for similar purposes and reasons described above at S270.

Processing proceeds to S285, where sampling mod 310 applies the determined sampling thresholds to data recorded in the second user-feature interaction data set correlated to the first feature and the second feature, storing data that has had sampling applied from the second feature in sampled data data store mod 312 and storing usage data from the third feature that has not had sampling applied in unsampled data data store mod 314. In this simplified embodiment, the first feature has a sampling threshold of 10%, the second feature has a sampling threshold of 40%, and the first user has a sampling rate value of 3. Because the sampling rate value of the second user falls outside of the sampling threshold of the first feature, the second user's 95,000 interactions today with the first feature are not stored in the sampled data data store mod 312, but because the second user's sampling rate value falls within the threshold of the second feature, their 4300 interactions today with the second feature are stored in the sampled data data store mod 312, which now sums the current value for the entry for the second feature with the second user's interactions with the second feature. This results in an updated value of 7,000 for the entry for the second feature in the sampled data data store 312. As the third feature has no sampling threshold applied, the second user's interactions with the third feature are fully stored in the unsampled data data store mod 314, which already includes an entry for today's usage of the third feature that has a value of 285. The second user's interactions with the third feature are added onto the value presently stored in the entry for the third feature in the unsampled data data store 314, resulting in an updated value of 1000. At this point in time, the sampled data store has two entries: (i) a first feature entry with a value of 10,000; and (ii) a second feature entry with a value of 7,000. The unsampled data store has one entry: a third feature entry with a value of 1000.

Figure 4:
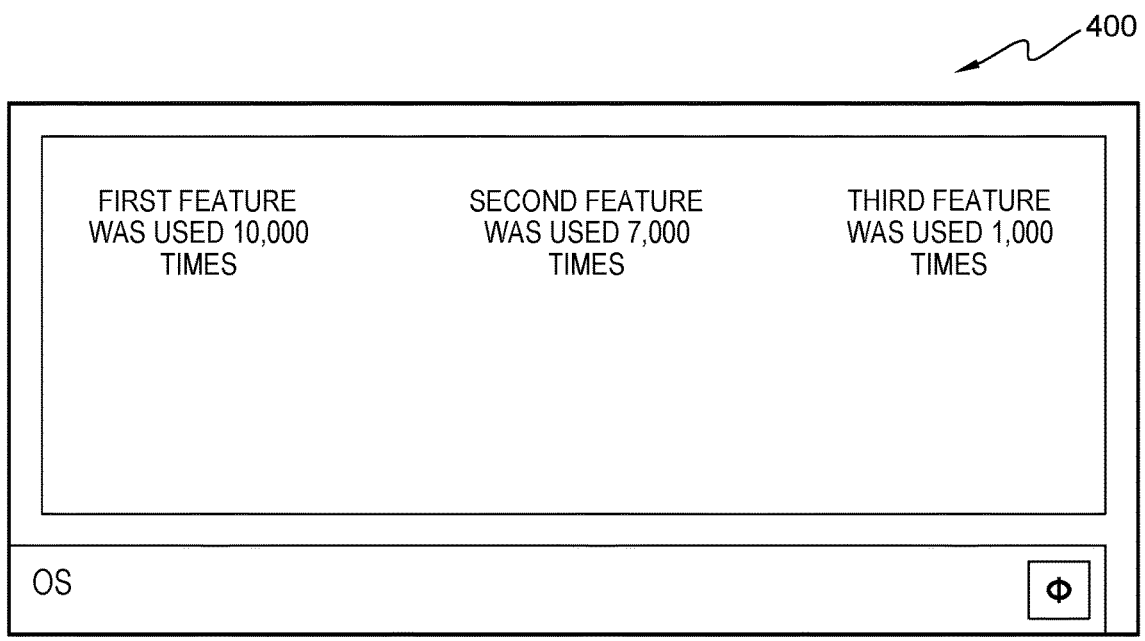
FIG. 4 is a screenshot view generated by the first embodiment system.

Processing proceeds to S290, where data collector mod 316 collects the data from sampled data data store mod 312 and unsampled data data store mod 314 and data aggregator sub-mod 318 aggregates them together for communication over network 114 of FIG. 1 to digital data analytics server 110, including screenshot 400 of FIG. 4. In this simplified embodiment of the present invention, digital data analytics server 110 receives the sampled data of sampled data data store 312 and the unsampled data of unsampled data data store 314 together as a stream of server calls. In alternative embodiments, the sampled data of the sampled data data store 312 and the unsampled data of the unsampled data data store 314 are sent separately. In yet other alternative embodiments, each entry in the sampled data of sampled data data store 312 includes an additional value indicative of the inverse of the sample rate for the entry to approximate the total overall usage from the actual recorded (sampled) data. For example, in the simplified embodiment where the first feature had a recorded (sampled) data of 10,000 that was stored in the sampled data data store mod 312, this additional value might be 10, to signify that digital data analytics results for this feature should be multiplied by 10 to approximate the actual feature usage before sampling was applied. In this alternative example, the actual feature usage was 105,000 (the sum of the first user's and the second user's interactions with the first feature before sampling was applied), the sampled feature interactions stored in the sampled data data store 312 was 10,000, and the approximated actual feature usage would be 100,000.

III. Further Comments and/or Embodiments

Some embodiments of the present invention recognize the following facts, potential problems and/or potential areas for improvement with respect to the current state of the art: (i) while state of the art sampling works well in reducing the costs and the load on the web analytics server, the accuracy of the user activity is drastically decreased; (ii) the accuracy reduction from sampling error is most severe during times of low usage and for particular pages or interactions that receive low usage; (iii) current art use one sampling rate across the entire website; (iv) the difference between the estimate of usage calculated from the sample data and the actual usage for all users is the sampling error; (v) a smaller sample size tends to produce a greater sampling error; (vi) in web analytics, it is common to establish a sampling rate rather than set a fixed sample size; (vii) as the sampling rate is increased, sample size increases and less sampling error is expected; (viii) however, when the sample size becomes sufficiently large, there is less expectation that sampling rate increases will continue to reduce sampling error; (ix) the term sampling is also used in the field of web analytics to mean querying a sample of the data set instead querying of the entire data set; (x) some terms sometimes considered synonymous with web analytics include digital audience measurement, web traffic measurement, and web usage data collection; (xi) web analytics is a more recognized term than digital analytics; and/or (xii) the shift to digital analytics from web analytics is used to include additional platforms such as mobile apps and smart TVs that have similar data collection mechanisms.

Some embodiments of the present invention may include one, or more, of the following features, characteristics and/or advantages: (i) retain a higher level of accuracy for end user activity but also reduce the load on the web analytics server to keep costs low; (ii) data collection cost is reduced versus measuring all page views and interactions; (iii) combine both sampling and inverse sampling based on seasonality curves; (iv) data accuracy is improved versus sampling that uses a uniform sampling rate across all page views and interactions; (v) data accuracy is improved versus sampling that does not adjust over time to account for usage spikes and troughs; (vi) web sites using embodiment systems are less likely to incur overage fees for exceeding their contracted analytics server call allotment; (vii) developers and analysts do not need to intervene to curb server call usage, reducing cost and risk; (viii) separate reporting suites created for unsampled and aggregated data; (ix) a system for measuring web site traffic that manages the volume of analytics server calls based on the usage rates of site features; (x) four factors influence how a some embodiment systems sample usage data: (a) rules set by web administrators, (b) volume of total server calls sent relative to server call cap, (c) current velocity of usage for each individual feature, and (d) historical usage data; (xi) further, a probability distribution function is fit to historical data for each feature to facilitate inverse sampling; (xii) the sampling and inverse sampling rates are combined for an overall sampling rate; (xiii) the system employs one analytics server that receives unsampled data and another analytics server that receives sampled data; (xiv) an aggregation system multiplies the sampled data by the appropriate sampling rates and adds this data to the unsampled data to calculate totals; (xv) by managing server call volume, some embodiment systems reduce the analytics cost; and/or (xvi) compared to existing sampling methods, accuracy is increased by employing an analytics server for unsampled data and by varying sampling rates according to feature usage.

Some embodiments of the present invention may implement a method which includes some or all of the following steps (not necessarily in the following order): (i) predicting usage rates for a plurality website features; (ii) setting a sampling rate for sampling usage data based on a plurality of machine logic rules that are dependent upon predicted usage rates of web site features; and (iii) managing the volume of the data collection system by applying the sampling rate in sampling usage data for use by an analytics server.

Some embodiments of the present invention may implement a method which includes some or all of the following steps (not necessarily in the following order): (i) predicting usage rates for a plurality website features; (ii) setting a sampling rate for sampling usage data based on a plurality of machine logic rules that are dependent upon predicted usage rates of web site features; (iii) managing the volume of the data collection system by applying the sampling rate in sampling usage data for use by an analytics server; and (iv) the plurality of machine logic rules include a first machine logic rule that sets sampling rate based upon Volume of total server calls sent relative to server call cap.

Some embodiments of the present invention may implement a method which includes some or all of the following steps (not necessarily in the following order): (i) predicting usage rates for a plurality website features; (ii) setting a sampling rate for sampling usage data based on a plurality of machine logic rules that are dependent upon predicted usage rates of web site features; (iii) managing the volume of the data collection system by applying the sampling rate in sampling usage data for use by an analytics server; and (iv) the plurality of machine logic rules include a first machine logic rule that sets sampling rate based upon predicted volume of total server calls sent relative to server call cap.

Some embodiments of the present invention may implement a method which includes some or all of the following steps (not necessarily in the following order): (i) predicting usage rates for a plurality website features; (ii) setting a sampling rate for sampling usage data based on a plurality of machine logic rules that are dependent upon predicted usage rates of web site features; (iii) managing the volume of the data collection system by applying the sampling rate in sampling usage data for use by an analytics server; and (iv) the prediction of usage rates is based on historical data.

Some embodiments of the present invention may include one, or more, of the following features, definitions, characteristics and/or advantages: (i) references to sampling are not related to sampling done when querying data, instead referring to sampling that occurs as part of the data collection process; (ii) analysis is a component of analytics; (iii) analysis is an examination of subject matter or data for the purpose of better understanding, extracting insights, or reaching conclusions; (iv) analytics is the methods by which individuals or organizations make use of data; (v) the field of analytics encompasses data strategy, data collection, data analysis, and data reporting; (vi) web analysis is an examination of data collected from web sites for the purpose of understanding and optimizing web usage; (vii) web analytics is the measurement, collection, analysis and reporting of web data for purposes of optimizing and understanding web usage; (viii) digital analysis is an examination of data collected from digital properties such as web sites, mobile applications, and smart television applications for the purpose of understanding and optimizing usage of these digital properties; (ix) digital analytics is the measurement, collection, analysis and reporting of data from digital properties such as web sites, mobile applications, and smart television applications for purposes of optimizing and understanding web usage; (x) web analysis and digital analysis are less commonly used, and more typically referred to as web data analysis and digital data analysis are more used and fit these same definitions; (xi) usage rate is the amount of usage for a website feature over a time period; (xii) some examples of usage rates: (a) the usage rate for the home page averaged 200,000 page views per day, (b) the usage rate for the Product A web page (a sub-page of the homepage) averaged 10,000 page views per day, (c) the usage rate for the navigation menu averaged 300,000 interactions per day, and (d) the usage rate for the product comparison feature averaged 3,000 interactions per day; (xiii) website features is a component of a website with which the user can interact, such a page that can be loaded or an on-page element the user can affect by clicking or hovering over; and/or (xiv) some examples of web site features include: (a) the home page of a website, (b) a news article web page, (c) a product detail web page, (d) the interaction a user makes when adding an item to the shopping cart, (e) the interaction a user makes when enlarging an image on a web page, and (f) the interaction a user makes when starting video playback on a web page.

Some embodiments of the present invention may include one, or more, of the following features, definitions, characteristics and/or advantages: (i) volume of total server calls refers to the total site-wide number of server calls that are actually sent to the analytics server; (ii) if a system according to some embodiments of the present invention sample home page loads at 10% of users which results in sending 100,000 server calls to the analytics server, the 100,000 server calls are counted towards the "volume of total server calls"; (iii) the estimated usage for the home page would be 1,000,000 but only 100,000 server calls would be sent to the analytics server; (iv) the actual number of server calls sent is critical because it determines how close the property is their contracted server call allotment; (v) a server call cap (also called contracted server call allotment) refers to the number of analytics server calls that can be sent from the website to the analytics server according the to the contract with the web analytics vendor; (vi) typically website administrators sign a contract with the web analytics vendor that stipulates a server call allotment; (vii) the price paid to the vendor is a function of number of server calls in the allotment; (viii) if the server call allotment is exceeded, an overage fee is typically incurred; (ix) projecting website usage as a way to manage the amount of server calls that are sent to the analytics server; (x) when sampling is employed, the analytics server will only receive server calls from users that are part of the sample; and/or (xi) the responsibility of the analytics server is to receive the calls from the website and insert the data into the database, so the data can be queried.

Some embodiments of the present invention may include one, or more, of the following features, characteristics and/or advantages: (i) a Sampling Management System automatically adjusts the sampling rates used for web analytics data collection in order to improve accuracy and reduce costs; (ii) inverse sampling rate is determined from learned probability distributions for each feature on a seasonality curve; (iii) system considers the web site's total consumption of web analytics server calls relative to server call allotment when setting sampling rates; (iv) system considers the velocity of usage in order to appropriately size sampling rates, ensuring that seasonality of usage does not contribute to greater sampling error; (v) sampling rates are set at the individual feature level according to the usage level of each feature, ensuring that features with lesser traffic are not subject to greater sampling error; (vi) web administrators can choose to keep usage of certain features unsampled; (vii) some embodiment systems separate the unsampled data, so it can be queried independently if desired; (viii) aggregation system scales sampled data up using the appropriate sampling rates and aggregates with unsampled data to provide total data to analytics users; (ix) send a server call for every page view and interaction; (x) send server calls according to a static sampling rate for every page view and interaction; (xi) make in-flight adjustments to production analytics implementation; (xii) automation of web analytics data collection sampling rates based on server call usage related to contracted allotment; (xiii) learning of seasonal inverse sampling probability distributions; (xiv) combining learning sampling and inverse sampling methods; (xv) automated adjustment of web analytics data collection sampling rate for an individual feature based on usage of that feature; and/or (xvi) sending sampled and unsampled data into separate analytics servers to ensure unsampled data purity, then aggregating for data completeness.

Some embodiments of the present invention may include one, or more, of the following features, characteristics and/or advantages: (i) for simplicity, some embodiments of the present invention use "web site" as the digital property for which usage data is being collected; (ii) some embodiments of the present invention also apply to other kinds of digital properties such as mobile applications, smart TV applications, set-top box applications, and smartwatch applications; (iii) Sampling Management System (System) is defined as software that manages the sampling levels for features on the website, considering analytics server call volume and feature usage; (iv) this includes both sampling and inverse sampling methods; (v) a Feature is any page view or interaction on the web site; (vi) each feature will be measured by the web analytics system; (vii) Analytics Server Call (Hit) is a HTTP request sent from the user's browser to the analytics server; (viii) server call contains data relevant to the individual action made on the web site and the user who initiated the action; (ix) using the Sampling Management System, the server call also contains the rate of sampling for that feature at the time the hit occurred; (x) Usage Velocity is the rate at which the audience is interacting with a feature; (xi) Velocity can be measured at various time levels (ex. per minute, per day); (xii) Sampling Rate is the percentage of users for which server calls will be sent for the individual feature; and/or (xiii) the system changes these rates over time.

Some embodiments of the present invention may include one, or more, of the following features, characteristics and/or advantages: (i) Inverse Sampling Rate is a random sample from a season PDF for each sample; (ii) a Sampling Threshold Cookie is a random value that is assigned to the user in their first access of the web site; (iii) this value is saved as a cookie file in user's browser that is referenced to determine whether analytics server calls will be sent; (iv) this cookie will persist throughout all sessions for the user; (v) Daily Feature Target Max is a configurable maximum for the target daily server calls of any individual feature; (vi) setting the max allows heavily used features to sampled more than less used features; (vii) Max Features are Features with usage that exceeds the Daily Feature Target Max; (viii) Feature Sampling Minimum is a value where Features that are projected to receive less daily usage than this configurable minimum will not be sampled; (ix) Web Analytics Servers are servers that receive analytics server calls from users' browsers; (x) one server will receive sampled data and one server will receive unsampled data; (xi) Aggregation System is software that multiplies up each sampled server call by the sampling rate for that server call; (xii) the Aggregation System then adds sampled data to unsampled data to calculate totals; (xiii) Reporting Suite is a collection of web analytics reports that draw from the same data source; and/or (xiv) the Sampling Management System produces a reporting suite for unsampled data and a reporting suite based on the aggregate of sampled and unsampled data.

Figure 5:
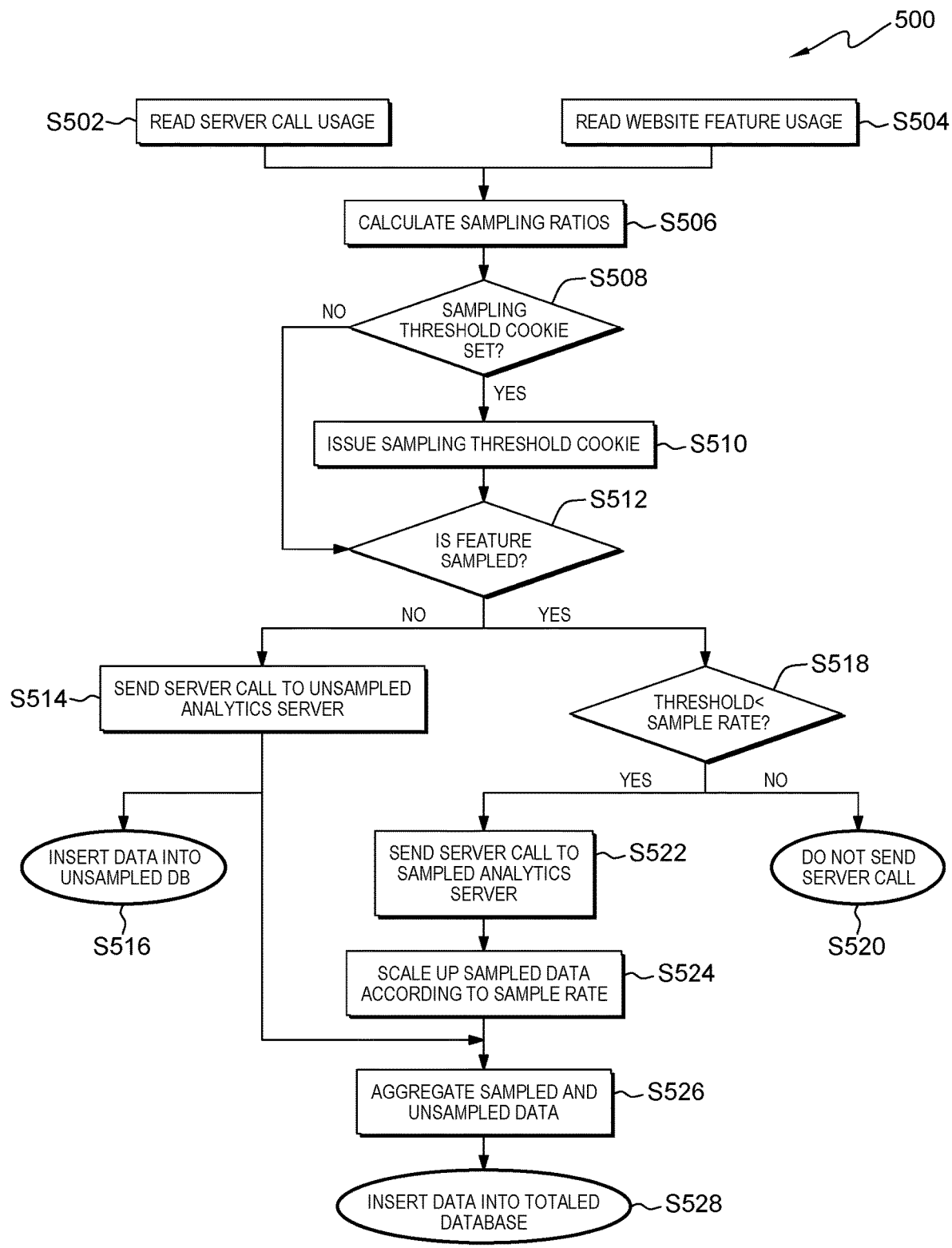
FIG. 5 is a flowchart diagram of a second embodiment of a method according to the present invention.

A method according to an embodiment of the present invention will now be discussed with reference to flowchart 500 of FIG. 5, with processes flowing among and between steps according to flowchart 500. At S502, the embodiment system reads a given web site's total analytics server call usage. At S504, the embodiment system reads usage velocity at the individual feature level. At S506, the embodiment system calculates sampling rate for each feature (see below). At S508, a determination is made that a sampling threshold cookie has been set. At S510, a user makes first visit to the web site, and the embodiment system through the web site saves a cookie in the user's browser with the sampling threshold for that user, where each user who visits the website receives a random value for the Sampling Threshold Cookie that they receive. This cookie will persist throughout this session and future sessions. At S512, a determination is made that the user accesses a feature of the website that is not being sampled. At S514, the web site sends server call to a first Analytics Server for unsampled data.

At S516, the unsampled data from the Analytics Server is inserted into a first Database. A reporting Suite reads from the first Database and makes unsampled data available for querying. When a user clicks on a feature on the web site that has a sampling level managed by the system at S512, the user's sampling threshold is compared to the sampling level for the accessed feature at S518. If the user's sampling threshold is less than the sampling rate, processing proceeds to S522, where a server call is sent to second Analytics Server for sampled data. This server call also contains the sampling rate that was applied at the time of the interaction.

At S524, the Aggregation System multiplies the data from each server call received by the second Analytics Server according to the appropriate sampling ratio. At S526, the Aggregation System reads the data from the first Analytics Server and adds to the upscaled data from the second Analytics Server to calculate total data. At S528, the Aggregation System inserts total data into a second Database. A second Reporting Suite reads from the second Database and makes the total data available for querying. At S518, if the sampling threshold for the user is less than the sampling rate, processing would proceed to S520 where no server call is sent.

Some embodiments of the present invention may include one, or more, of the following calculations:
[i] Server Calls Remaining=Server Call Allotment for Period−Server Calls Consumed to Date
[ii] Web analytics contracts often have a per month or per year server call allotment.
[iii] Daily Target=Server Calls Remaining/Days Left in Period
[iv] Max Feature Savings=Estimated Total Calls from Max Features If Not Capped−(Daily Feature Target Max*# of Features that Exceed Daily Feature Target Max)
[v] Feature Share=Estimated Interactions for Feature/ (Estimated Total Interactions−Max Feature Savings)
[vi] Daily Feature Target=Feature Share*Daily Target
[vii] Hourly Feature Velocity=Estimated Interactions Over the Last Hour
Alternatively, velocity can be calculated at other time levels such as per minute or per day.
[viii] Daily Feature Projection (from Velocity)=Hourly Feature Velocity*24
[ix] Daily Feature Projection (from Inverse CDF)=quantile(historical data array, seasonality variable)
[x] Daily Feature Projection=Velocity Weight*Velocity Projection+Inverse CDF Weight*Inverse CDF Projection
[xi] Feature Sampling Rate=Daily Feature Target/Daily Feature Projection
The feature would not be sampled if Target>Projection.

Some embodiments of the present invention may include one, or more, of the following features, characteristics and/or advantages: (i) Velocity Projection is calculated using actual usage rates as they are occurring; (ii) inverse CDF Projection is calculated using historical data and a seasonality expectation; (iii) both are inputs into Daily Feature Projection; (iv) Daily Feature Projection is an input into the Feature Sampling Rate calculation; and/or (v) the feature would not be sampled if Target>Projection.

Figure 6:
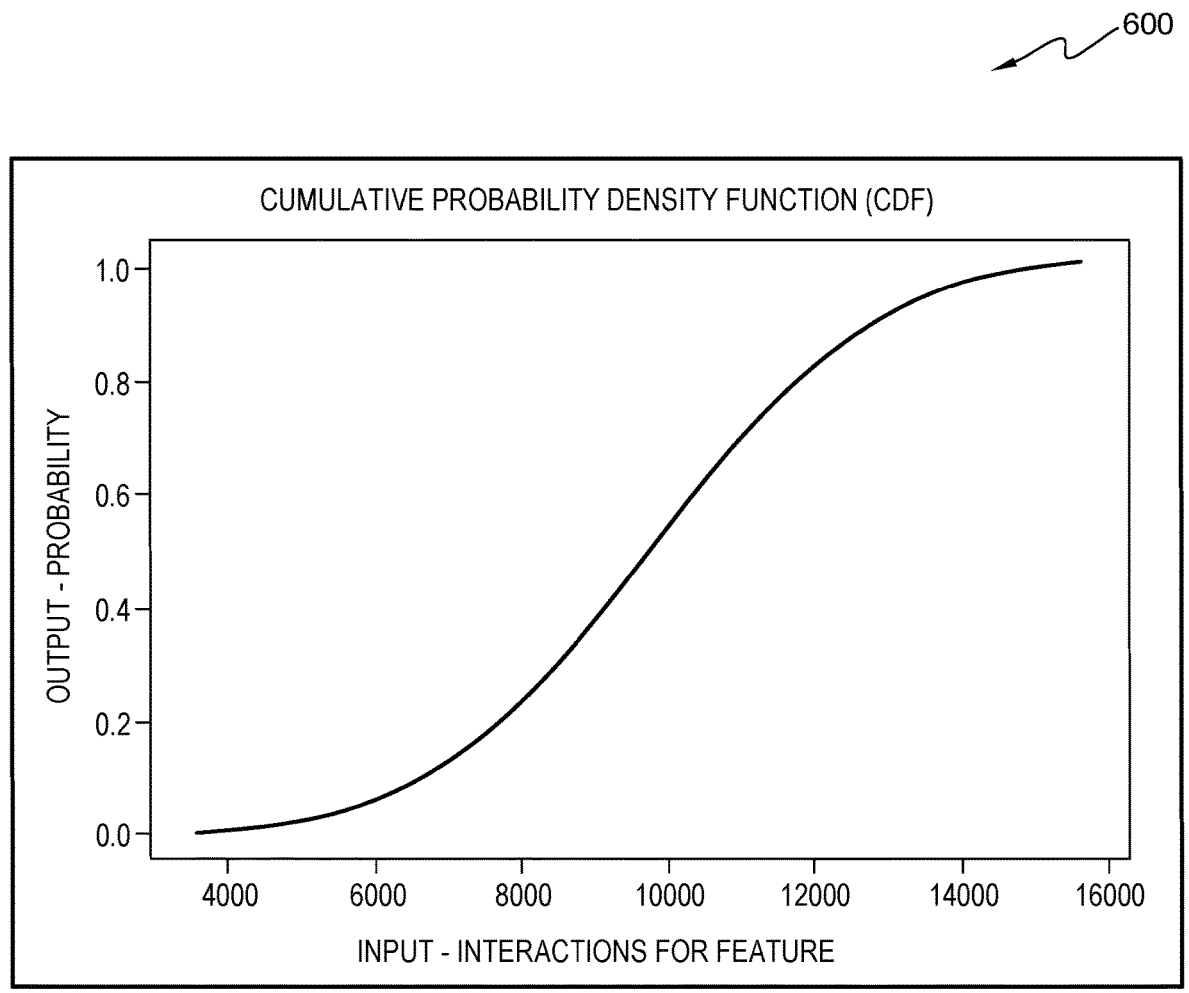
FIG. 6 is a graph showing information that is helpful in understanding calculations of usage probability performed by software according to embodiments of the present invention.
Figure 7:
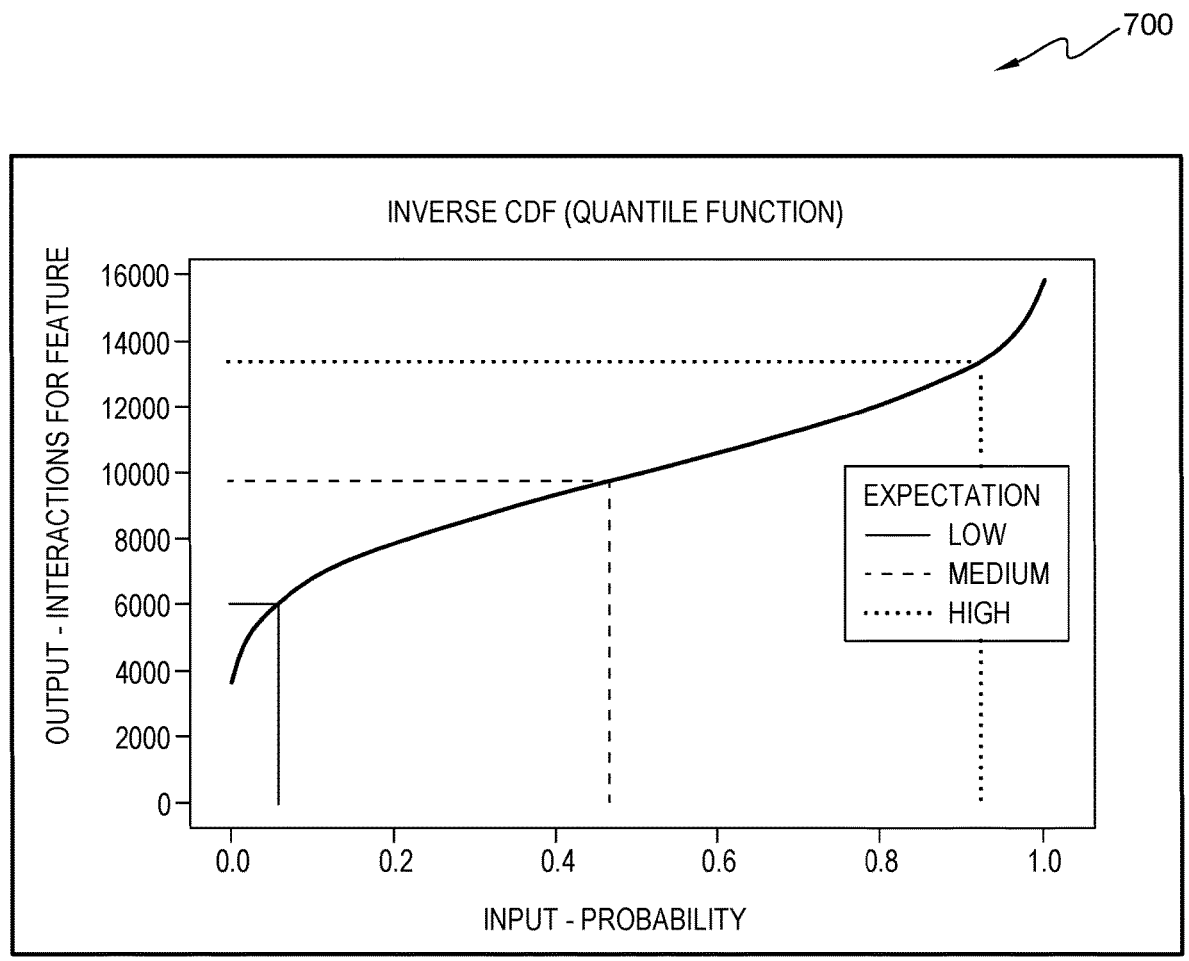
FIG. 7 is a graph showing information that is helpful in understanding calculations of anticipated usage of digital property features performed by software according to embodiments of the present invention.

Some embodiments of the present invention may include one, or more, of the following features, characteristics and/or advantages: (i) cumulative probability density function (CDF) graph 600 of FIG. 6 showing a relationship between the input (quantity of interactions with a feature) with an output of probability of feature interaction; and (ii) inverse cumulative probability density function (ICDF) graph 700 of FIG. 7 showing a relationship between the input (probability of feature interaction) with an output of anticipated quantity of feature interactions.

Some embodiments of the present invention read on the following examples: (i) a first webpage has a measurement sample size of 10%; (ii) in a first scenario—a first user is included in the sample size; (iii) the first loads the first webpage; (iv) a random number (0) is generated by code on the first web page for a sampling threshold for the first user; (v) 0 is less than the sample size and a web browser cookie is set for recording that the first user should be included in the sample size; (vi) Page View is recorded with the first Analytics Server for the first user's visit to the first website; (vii) for new sessions, a Visit is also recorded; (viii) for new users, a Unique User is also recorded; (ix) the first user's interactions are recorded with the first Analytics Server; (x) any future activity is also recorded with the first Analytics Server; (xi) data from the Analytics Server is aggregated by an aggregation system; (xii) the aggregation system multiplies Page Views, Visits and Unique Users by 10; (xiii) in a second scenario—a second user is not included in the sample size; (xiv) the second user loads the first webpage; (xv) a random number 4 is generated by code on the first webpage; (xvi) as 4 is greater than the sample size, a web browser cookie is set recording that the second user should not be included in the sample size; (xvii) Page View activity of the second user is not recorded; (xviii) the second user's interactions are recorded with a second Analytics Server; (xix) data from the Analytics Server (which records Interactions) is aggregated by an aggregation system; and (xx) when both the first scenario and second scenario are considered together, Page Views, Visits and Unique Users are estimated values. Interactions are accurate and not estimated.

Some embodiments of the present invention read on the following example: (i) a web site consists of a Live Scores page, News Landing page, and History page; (ii) High page views for Live Scores page>Sample at 10%; (iii) Medium page views for News Landing page>Sample at 25%; and/or (iv) Low interactions for enlarging images on History page>Do not sample.

Some embodiments of the present invention read on the following example: (i) a web site has a contracted allotment of 2 billion server calls for the year 2018; (ii) the Sampling Management System has managed server call usage throughout the year and 85% of the allotment has been consumed by late November; (iii) the web site experiences higher traffic during Thanksgiving weekend and decreases the sampling rate on the Home page from 20% to 10%; (iv) following Cyber Monday, the site experiences lower traffic; and/or (v) the Home page sampling rate is then increased from 10% to 15%.

IV. Definitions

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Module/Sub-Module: any set of hardware, firmware and/ or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
determining a predictive usage data set including information indicative of anticipated usage of a set of features of a digital property;
determining a subset of features from the set of features of the digital property for application of a data sampling threshold, where a given feature in the subset of features is determined for inclusion in the subset based, at least in part, on the anticipated usage of the given feature indicated in the predictive usage data set exceeding a predefined allotment of server calls for the given feature;
for each feature of the subset of features, determining a sampling threshold value based, at least in part, on the predictive usage data set, where a sampling threshold value for a given feature of the subset of features is inversely proportionate to anticipated usage of the given feature relative to other features of the set of features;
responsive to usage of the subset of features by a plurality of users over a computer network, generating a user data collection data set based, at least in part, on the determined sampling threshold value(s) including: (i) identifying information for the plurality of users, and (ii) for each user of the plurality of users, feature usage values corresponding to usage counts, for the user, with the usage counts respectively corresponding to each feature of a set of feature(s); and
aggregating data including information indicative of usage of the set of features of the digital property, including: (i) data that has been sampled and multiplied, and (ii) data that has not been subject to a sampling threshold;
wherein:
data resulting from usage of at least some features of the digital property are not subject to a sampling threshold; and
data gathered from each given feature of the subset of features is multiplied by a term correlated to the sample threshold value to approximate unsampled usage of each given feature.

2. The CIM of claim 1, wherein the feature usage values are sampled according to the sampling threshold value.

3. The CIM of claim 1, wherein the sampling thresholds are based, at least in part, on a proportion of total consumption of digital data analytics server calls by the digital property compared to the total digital data analytics server call allotment of the digital property.

4. The CIM of claim 1, wherein the sampling threshold value is based, at least in part, on velocity of usage of the feature.

5. The CIM of claim 1, wherein the predictive usage data set is based, at least in part, on historical usage data including information indicative of historical usage of at least some features of the digital property.

6. A computer system (CS) comprising:
a processor(s) set;
a machine readable storage device; and
computer code stored on the machine readable storage device, with the computer code including instructions for causing the processor(s) set to perform operations including the following:
determining a predictive usage data set including information indicative of anticipated usage of a set of features of a digital property;
determining a subset of features from the set of features of the digital property for application of a data sampling threshold, where a given feature in the subset of features is determined for inclusion in the subset based, at least in part, on the anticipated usage of the given feature indicated in the predictive usage data set exceeding a predefined allotment of server calls for the given feature;
for each feature of the subset of features, determining a sampling threshold value based, at least in part, on the predictive usage data set, where a sampling threshold value for a given feature of the subset of features is inversely proportionate to anticipated usage of the given feature relative to other features of the set of features;
responsive to usage of the subset of features by a plurality of users over a computer network, generating a user data collection data set based, at least in part, on the determined sampling threshold value(s) including: (i) identifying information for the plurality of users, and (ii) for each user of the plurality of users, feature usage values corresponding to usage counts, for the user, with the usage counts respectively corresponding to each feature of a set of feature(s); and
aggregating data including information indicative of usage of the set of features of the digital property, including: (i) data that has been sampled and multiplied, and (ii) data that has not been subject to a sampling threshold;
wherein:
data resulting from usage of at least some features of the digital property are not subject to a sampling threshold; and
data gathered from each given feature of the subset of features is multiplied by a term correlated to the sample threshold value to approximate unsampled usage of each given feature.

7. The CS of claim 6, wherein the feature usage values are sampled according to the sampling threshold value.

8. The CS of claim 6, wherein the sampling thresholds are based, at least in part, on a proportion of total consumption of digital data analytics server calls by the digital property compared to the total digital data analytics server call allotment of the digital property.

9. The CS of claim 6, wherein the sampling threshold value is based, at least in part, on velocity of usage of the feature.

10. The CS of claim 6, wherein the predictive usage data set is based, at least in part, on historical usage data including information indicative of historical usage of at least some features of the digital property.

11. A computer program product (CPP) comprising:
a machine readable storage device; and
computer code stored on the machine readable storage device, with the computer code including instructions for causing a processor(s) set to perform operations including the following:

determining a predictive usage data set including information indicative of anticipated usage of a set of features of a digital property;

determining a subset of features from the set of features of the digital property for application of a data sampling threshold, where a given feature in the subset of features is determined for inclusion in the subset based, at least in part, on the anticipated usage of the given feature indicated in the predictive usage data set exceeding a predefined allotment of server calls for the given feature;

for each feature of the subset of features, determining a sampling threshold value based, at least in part, on the predictive usage data set, where a sampling threshold value for a given feature of the subset of features is inversely proportionate to anticipated usage of the given feature relative to other features of the set of features;

responsive to usage of the subset of features by a plurality of users over a computer network, generating a user data collection data set based, at least in part, on the determined sampling threshold value(s) including: (i) identifying information for the plurality of users, and (ii) for each user of the plurality of users, feature usage values corresponding to usage counts, for the user, with the usage counts respectively corresponding to each feature of a set of feature(s); and aggregating data including information indicative of usage of the set of features of the digital property, including: (i) data that has been sampled and multiplied, and (ii) data that has not been subject to a sampling threshold;

wherein:

data resulting from usage of at least some features of the digital property are not subject to a sampling threshold; and data gathered from each given feature of the subset of features is multiplied by a term correlated to the sample threshold value to approximate unsampled usage of each given feature.

12. The CPP of claim 11, wherein the feature usage values are sampled according to the sampling threshold value.

13. The CPP of claim 11, wherein the sampling thresholds are based, at least in part, on a proportion of total consumption of digital data analytics server calls by the digital property compared to the total digital data analytics server call allotment of the digital property.

14. The CPP of claim 11, wherein the sampling threshold value is based, at least in part, on velocity of usage of the feature.

15. The CPP of claim 11, wherein the predictive usage data set is based, at least in part, on historical usage data including information indicative of historical usage of at least some features of the digital property.

* * * * *